(12) United States Patent
Gabriel et al.

(10) Patent No.: US 6,227,146 B1
(45) Date of Patent: May 8, 2001

(54) FILTER TOP FOR RODENT CAGE

(75) Inventors: George S. Gabriel, Seaford, DE (US); Neil E. Campbell, Eden, MD (US); Chin Soo Park, Salisbury, MD (US); John E. Sheaffer, Perryville, MD (US); Dale Murray, Elkton, MD (US); Lynn Irwin, Seaford, DE (US)

(73) Assignee: Lab Products Inc., Seaford, DE (US)

( * ) Notice: Subject to any disclaimer, the term of this patent is extended or adjusted under 35 U.S.C. 154(b) by 0 days.

(21) Appl. No.: 09/326,846

(22) Filed: Jun. 7, 1999

Related U.S. Application Data (63) Continuation-in-part of application No. 09/173,134, filed on Oct. 15, 1998, which is a continuation-in-part of application No. 09/106,389, filed on Jun. 26, 1998, now Pat. No. 6,041,741.

(51) Int. Cl.$^7$ ........................................................ A01K 1/03
(52) U.S. Cl. ........................ 119/419; 119/454; 119/475
(58) Field of Search .................................. 119/419, 417, 119/453, 454, 455, 475

(56) References Cited

U.S. PATENT DOCUMENTS

| | | | |
|---|---|---|---|
| 3,002,492 | 10/1961 | Naturale | 119/18 |
| 3,212,474 | 10/1965 | Higgins | 119/18 |
| 3,244,147 | 4/1966 | Kogeichi et al. | 119/18 |
| 3,334,614 | 8/1967 | Gass et al. | 119/18 |
| 3,537,428 | 11/1970 | Montgomery | 119/18 |
| 3,585,968 | 6/1971 | Stone | 119/22 |
| 3,822,673 | 7/1974 | Benny | 119/22 |
| 3,896,768 | 7/1975 | Galloway | 119/22 |
| 3,978,819 | 9/1976 | Lovitt | 119/22 |
| 4,206,720 | 6/1980 | Ruggeri et al. | 119/17 |
| 4,480,587 | 11/1984 | Sedlacek | 119/15 |
| 4,640,228 | * 2/1987 | Sedlacek et al. | 119/419 |
| 4,690,100 | 9/1987 | Thomas | 119/15 |
| 4,840,142 | 6/1989 | Ishikawa et al. | 119/17 |
| 4,907,536 | 3/1990 | Chrisler | 119/15 |
| 5,000,120 | * 3/1991 | Coiro, Sr. et al. | 119/419 |
| 5,044,316 | * 9/1991 | Thomas | 119/419 |
| 5,524,573 | 6/1996 | Hart | 119/489 |
| 5,749,321 | 5/1998 | Ikuse et al. | 119/458 |
| 5,794,567 | 8/1998 | Itzhak | 119/416 |
| 5,924,384 | 7/1999 | Deitrich et al. | 119/419 |
| 5,954,013 | * 9/1999 | Gabriel et al. | 119/419 |

FOREIGN PATENT DOCUMENTS

| | | | |
|---|---|---|---|
| 2 332 612 | 6/1999 | (GB) . | |
| 635382 | * 3/1962 | (IT) | 119/417 |

* cited by examiner

Primary Examiner—Michael J. Carone
Assistant Examiner—Son T. Nguyen
(74) Attorney, Agent, or Firm—Stroock & Stroock & Lavan LLP

(57) ABSTRACT

A filter bonnet for an open-top cage includes:
a filter top adapted to cover the open top of the open-top cage. The filter top has a body portion with a perforated top wall and side walls extending therefrom forming an open bottom end. A shield is permanently affixed to the top wall and disposed within an area defined by the side walls.

9 Claims, 12 Drawing Sheets

FILTER TOP FOR RODENT CAGE

CROSS REFERENCE TO OTHER APPLICATIONS

This is a Continuation In Part Application of copending U.S. patent application Ser. No. 09/173,134 pending filed on Oct. 15, 1998 for Multipurpose Rat Cage; which is a Continuation In Part of U.S. patent application Ser. No. 09/106,389 U.S. Pat. No. 6,041,741 filed on Jun. 26, 1998 for Multispecies Rodent Cage.

BACKGROUND OF INVENTION

This invention relates generally to a rodent cage which may be used as a static unit or in connection with a ventilated cage and rack system for housing a variety of rodent types and in particular to a filter top for such a cage.

Ventilated cage and rack systems are well known in the art. One such ventilated cage and rack system is disclosed in U.S. Pat. No. 4,989,545, assigned to Lab Products, Inc., in which an open rack system including a plurality of shelves, each formed as an air plenum is provided. A ventilation system is connected to the rack system for ventilating each cage in the rack. It is known to house rats for study in such a ventilated cage and rack system.

Filter tops for animal cages within ventilated cage and rack systems are also well-known in the art. One such filter top is disclosed in U.S. Pat. No. 4,640,228, assigned to Lab Products, Inc. in which a bonnet with a perforated top wall is provided. A sheet of filter paper is sandwiched between the retainer and the lower surface of the perforated top wall of the bonnet. A retainer is detachably mounted inside the bonnet body in flush abutment with the filter material placed against the lower surface of the top wall of the bonnet the retainer comprises a narrow border portion and flat cross arms which intersect at an integral central portion.

Accordingly it is desired to provide a filter cage top for a cage which protects the filter and cage top while being easy to clean.

SUMMARY OF THE INVENTION

The present invention is for a bonnet for covering a cage bottom, the bonnet including a top for covering the top rim of the cage bottom The top has a skirt descending from the perimeter. A filter is disposed on the top for filtering air entering the cage bottom. A filter retainer rests on the filter top and is disposed above the filter. A shield, substantially co-extensive with a bottom surface of the top is affixed to the bottom surface of the top.

In a preferred embodiment, the shield is perforated and is affixed to the top at a spaced distance from the top.

Accordingly, it is an object of the invention to provide an improved filter top for animal cage.

Another object of the invention is to provide a filter top which includes integral protection for the filter and filter top.

A further object of the invention is to provide a cage with increased useable space by removing the wire bar lid.

Yet another object of the invention is to provide a filter top which may be easily cleaned, and in which a filter may be changed without needing to open the cage.

Still other objects and advantages of the invention will in part be obvious and will in part be apparent from the specification.

The invention accordingly comprises the features of construction, combination of elements and arrangements of parts which will be exemplified in the construction here and after set forth, the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Referring now to FIGS. 1–6, there is shown a rat cage 1 constructed in accordance with the present invention. Rat cage 1 includes a cage bottom 3 having four integral side walls 12 and a floor 13. Cage bottom 3 also includes an open top end 16. Extending continuously around top end 16 of cage bottom 3 is a peripheral lip 8 having a smooth and flat surface. A rim 4 vertically descends from peripheral lip 8. A pair of recesses 35, 35' are formed in peripheral lip 8. In an exemplary embodiment, recess 35 is disposed in the portion of peripheral lip 8 adjacent a corner of cage bottom 3 while recess 35' is disposed in the portion of peripheral lip 8 that is opposite recess 35.

Although cage bottom 3 may be constructed from any suitable material, it is preferable that it be molded from transparent plastic so that the animal contained in cage bottom 3 can be monitored through side walls 12. Also, it is preferred that cage bottom 3 have rounded corners thereby preventing the animals, such as rats from purchasing on the corners and gnawing their way out of cage 1.

The dimension of cage bottom 3 is optimized to permit the housing of different rodent types, including mice, rats, hamster, gerbils and guinea pigs in conformance with ILAR and AWA guidelines. The dimension of cage bottom 3 is also optimized to permit the maximum number of rats to be supported by a rack having substantially the same footprint as the prior art rack footprint and allowing the rack with the cage therein to pass through the standard doorway having a width of 36 inches. It has been determined that an optimum cage has a footprint of between 80 square inches and 140 square inches. In other words, the area of the cage may be expressed as:

$$80 \text{ inches} \leq l \times w \leq 140 \text{ inches}$$

where l is equal to the length of the interior floor space of the cage and w is equal to the width of interior floor space; the difference between the exterior and interior dimensions being insignificant for the purposes of the claimed invention. Furthermore, the length of the cage and/or the rack must be less than 36 inches so that a rack containing the cages when wheeled through a doorway can pass through the standard 36 inch doorway when the rack is a single sided rack.

In a preferred embodiment, cage bottom 3 is selected to have a size of approximately 80 square inches measured at the bottom of cage bottom 3 with a depth of approximately 7⅝ inches. Because many studies can begin housing two rats per cage, cage bottom 3 having an area of about 80 square inches can support two rats of up to 400 grams each. Once the rats grow, for example, in long-term studies, they will be placed in the same cage individually. Also, cage bottom 3 having an area of about 80 square inches can accommodate either a guinea pig or at least five mice while complying with ILAR and AWA guidelines. Thus, by selecting a rat cage bottom 3 having an area of about 80 square inches, a single cage 1 can be used to support a variety of rodent types. Accordingly, by standardizing cage bottom 3 having this dimension, a research facility will greatly simplify the inventory and management of cages 1 and racks.

A feeder assembly, generally indicated as 23, is supported in cage bottom 3 for providing food and water to the rats housed therein. Feeder assembly 23 includes a frame 69 having a platform portion 68.

Extending from two opposite sides of platform 68 are a pair of flanges 39, 39'. Flanges 39, 39' extend outwardly from frame 69 with flange 39 disposed on one side of frame 69 and flange 39' disposed on the opposite side of frame 69. Flanges 39, 39' may be either integrally formed with frame 69 or separately formed and then fixed to frame 69 thereafter. Flanges 39, 39' are dimensioned and shaped so that when feeder assembly 23 is disposed in cage bottom 3, flanges 39, 39' are received in recesses 35, 35', respectively, and are flush with peripheral lip 8 of cage bottom 3.

A lip 17 extends along a front of platform 68 which is intermediate the sides of frame 69 containing flanges 39, 39'. Lip 17 extends upward and away from frame 69. Feeder assembly 23 is placed in cage bottom 3 so that lip 17 extends toward the center of cage 1. In an exemplary embodiment, lip 17 is smooth and curved to prevent rats in cage bottom 3 from purchasing on lip 17 or feeder assembly 23 to either gain access to the food and water contained in feeder assembly 23 from above or from purchasing for gnawing at feeder assembly 23. Also, lip 17 serves as a handle for positioning feeder assembly 23 in cage bottom 3.

A first support 52 and a second support 52' depend from platform 68 and form open ended polygons suspended therefrom. Supports 52, 52' have sides 56. Supports 52 and 52' of feeder assembly 23 can be adapted to support either food or water for the rats housed in cage bottom 3. To adapt support 52 for food, a snap on food holder 37 is attached to the bottom of support 52. A skirt 73 is disposed around the circumference of the bottom of supports 52, 52'. Food holder 37 includes a peripheral rim 71. Descending from peripheral rim 71 is a plurality of U-shaped bars 38 on food holder 37. U-shaped bars 38 are spaced apart so that food disposed in support 52 is retained by food holder 37 but yet allows the rats in cage bottom 3 to remove the food from between U-shaped bars 38 of food holder 37. Rim 71 is dimensioned to receive skirt 73 and peripheral rime 71 to support 52 or 52'. It also provides a flush continuous surface eliminating purchase points and protecting the edges of skirt 73 from the animal. A recess 77 is disposed on skirt 73. A lock tab 75 is disposed on rim 71. Lock tab 75 and recess 77 are dimensioned and positioned so that when food holder 37 is connected to support 52, lock tab 75 is inserted into recess 77 thereby securing food holder 37 to support 52. In a preferred embodiment rim 71 is flush with the side 56 of support 52 or 52' so that rats cannot perch on rim 71 or sides 56. In a preferred embodiment, food holder 37 is constructed from stainless steel so that the rats are prevented from gnawing through food holder 37 and support 52.

Figure 13A:
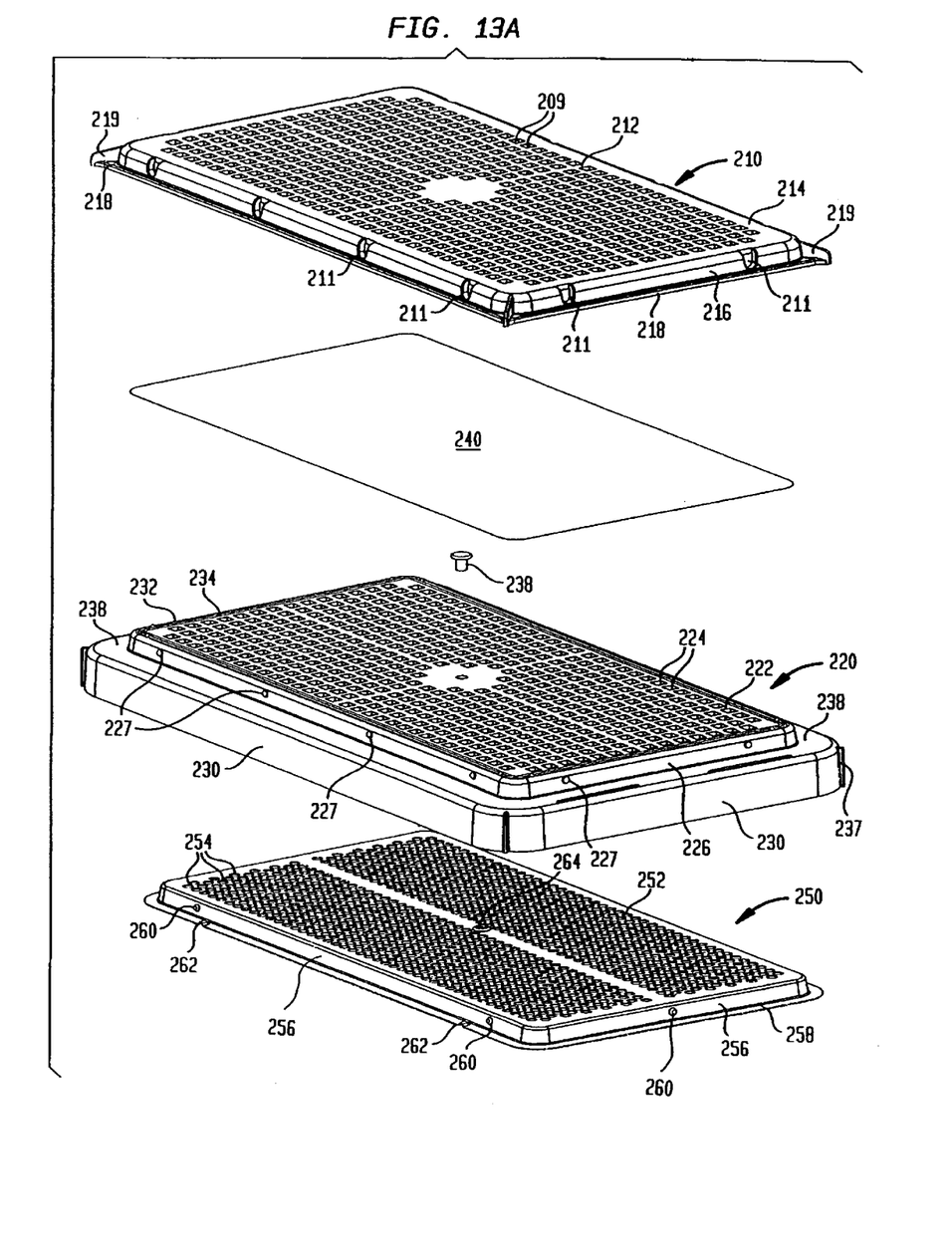
Figure 13B:
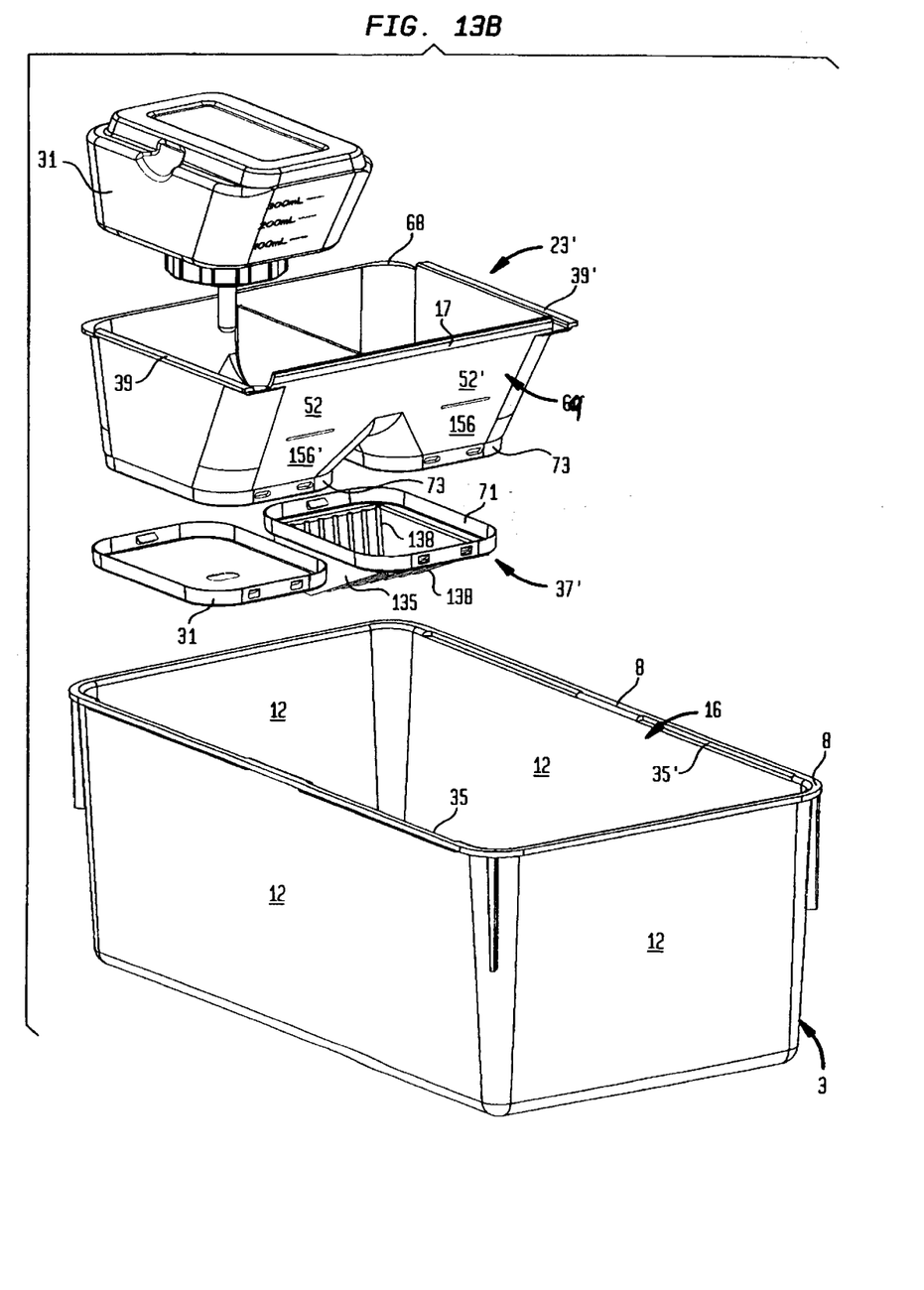
Figure 14:
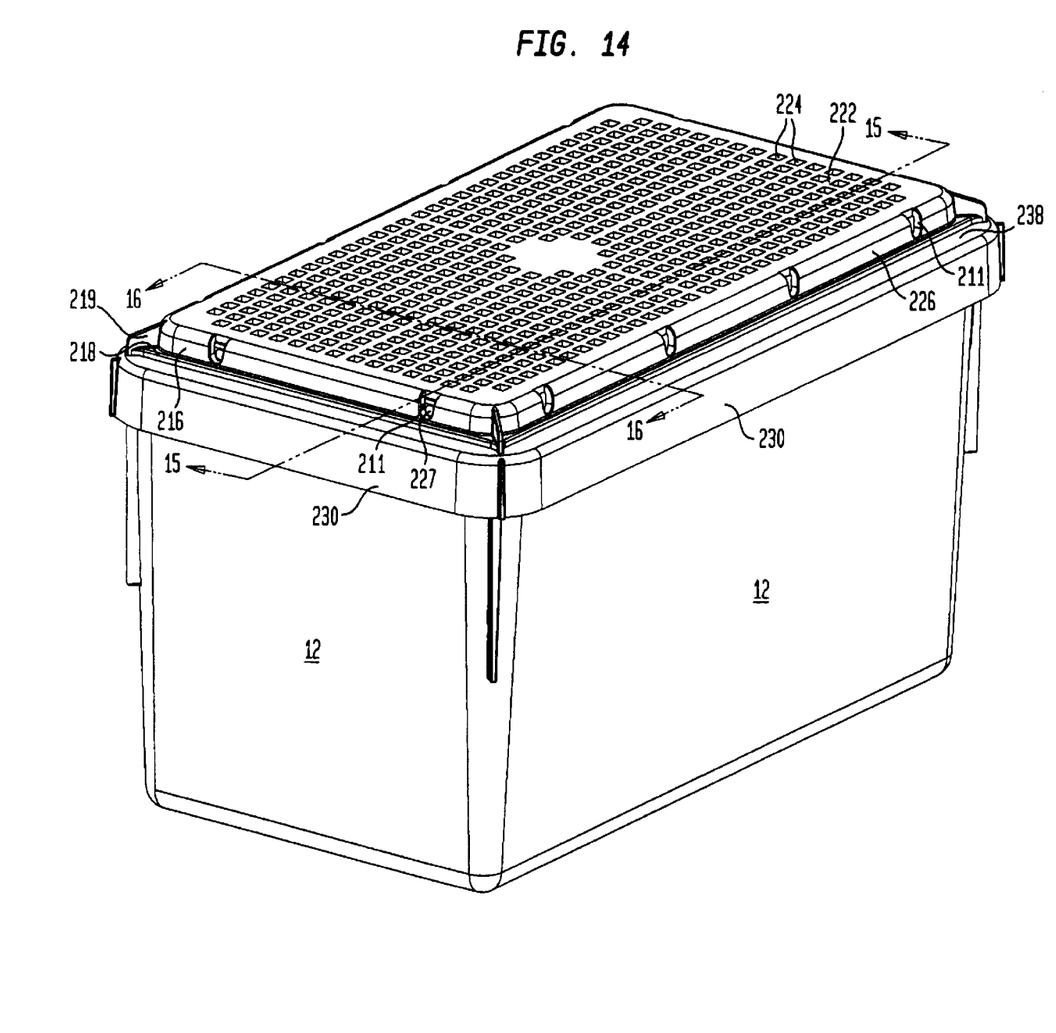
FIG. 14 is a perspective view of the cage constructed in accordance with the second embodiment of the invention.
Figure 15:
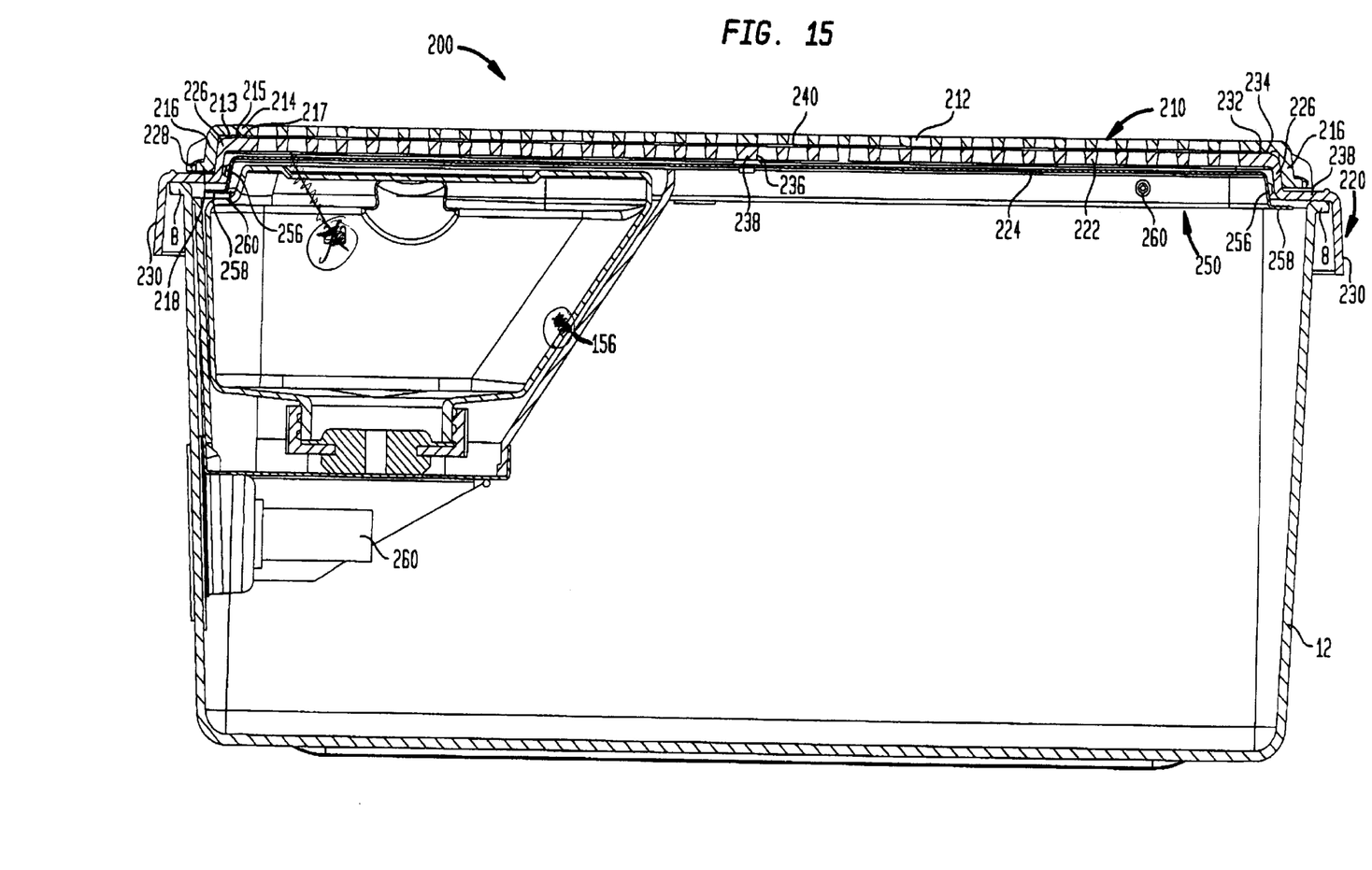
FIG. 15 is a sectional view taken along line 15—15 of FIG. 14.

As shown in FIG. 15, in a preferred embodiment, front wall 156 of supports 52, 52' is tapered from front to back. Additionally, as shown in FIG. 13, wire bars 138 and side panels 137 which depend from frame 71 of food holder 37' are also tapered from front to back before extending upwards again towards frame 71 to maximize head room within cage 3.

Either support 52 or 52' may also be adapted to receive a water bottle 21 to provide water to the rats in cage bottom 3. To adapt support 52 for water, a water bottle support 31 is secured to the bottom of support 52. As with food holder 37, water bottle support 31 includes a rim 71 having a recess 77 so that when rim 71 is placed about skirt 73 of support 52, recess 77 mates with lock tab 75 and rim 71 fits about skirt 73 so that rim 71 is flush with the sides 56 of support 52. Descending from rim 71 of water bottle support 31 are four integral walls and a floor 34. The walls 36 of water bottle support 31 are inwardly offset from rim 71 of water bottle support 31 thereby forming a shoulder 33 between walls 36 and rim 71 around the inside circumference of water bottle support 31. A floor 34 is supported by walls 36. Located in the center of floor 34 is a hole or slot. In a preferred embodiment, water bottle support 31 is constructed of stainless steel so that the rats in cage bottom 3 are prevented from gnawing through water bottle support 31 and support 52.

By providing a feeder assembly having interchangeable feeder and water bottle snap on components, the height at which food and the water extend into the cage can be adjusted for the particular various species being housed therein. Therefore, the problem of providing food to a plurality of different species of different sizes has been addressed while utilizing a single cage size.

It is preferred that supports 52 and 52' be constructed from transparent plastic so that the food levels in supports 52 and 52' can be monitored through side walls 12. Supports 52 and 52' may be formed in any suitable shape including conical and rhomboidal but are preferably a rounded polygon to prevent chewing and maximize volume. Supports 52, 52' are radiused at the corners to sufficiently prevent chewing by the animal. Studies have shown that by way of example a radius of about 1 inch at the top tapering to ⅞ of an inch at the bottom has been sufficient. Support 31 and feeder holder 37 may also be formed of plastic. The corners would be sufficiently radiused to prevent gnawing by the animal.

Because supports 52, 52' can each hold both food or water it is possible to double the food capacity by utilizing two feedholders 37 and a rack watering valve 260 as known in the art and shown in FIG. 15. This extends the life of the study and reduces the number of times that the top must be removed.

Water bottle 21 includes a main body 24 for containing water that is preferably dimensioned and shaped to mate with support 52. Main body 24 substantially fills support 52 so that the water capacity of water bottle 21 is maximized. It is also preferable that main body 24 be constructed from a transparent material so that the amount of water remaining in water bottle 21 can be monitored through side walls 12 and the walls of supports 52, 52'. The top portion of main body 24 includes a pair of molded recesses 25 disposed on opposite sides of main body 24 so that water bottle 21 may be easily gripped and removed from support 52. Water bottle 21 is positioned in support 52 in a substantially vertical orientation so that substantially all the water stored in water bottle 21 will drain out therefrom.

Main body 24 is tapered in a manner which forms a shoulder 22 around the circumference of main body 24 which extends into a neck 23. As a result, when water bottle 21 is placed in support 52, shoulder 22 contacts ledge 33 of support 52 thereby supporting water bottle 21 in support 52.

Neck 23 of water holder 24 narrows to an opening into which a rubber stopper 29 is inserted or screw cap is placed. A tube 27 extends from rubber stopper 29. When water bottle 21 is placed into support 52, tube 27 is inserted through the hole or slot in floor 34 of water bottle support 31 and extends towards cage bottom 3 thereby providing the rats in cage bottom 3 with access to the water in water bottle 21.

Top end 16 of cage bottom 3 is covered with a bonnet 14. Bonnet 14 includes three parts that are connected together into one unit: a top 9, a filter 7 and a filter retainer 5. The parts of bonnet 14 are arranged so that top 9 is in direct contact with top lip 8 of cage bottom 3, filter 7 is disposed on top 9 and filter retainer 5 is placed on top of filter 7 and is secured to top 9 thereby forming a unitary structure.

In an exemplary embodiment, top 9 is dimensioned and shaped to cover and effectively seal top end 16 of cage bottom 3. Top 9 is formed from a resilient material, by way of example stainless steel or plastic designed without purchase points, so that the rats in cage 1 are prevented from gnawing through bonnet 14 to filter 7. Top 9 is also perforated, having a plurality of air passages 62, across its surface so that air can pass through top 9 into cage bottom 3. The top surface of top 9 includes a series of cross beams 41 for supporting filter 7 away from the holes separating filter 7 from access by the animals contained within the cage. Cross beams 41 divide the surface of top 9 into a plurality of areas 42.

Figure 1:
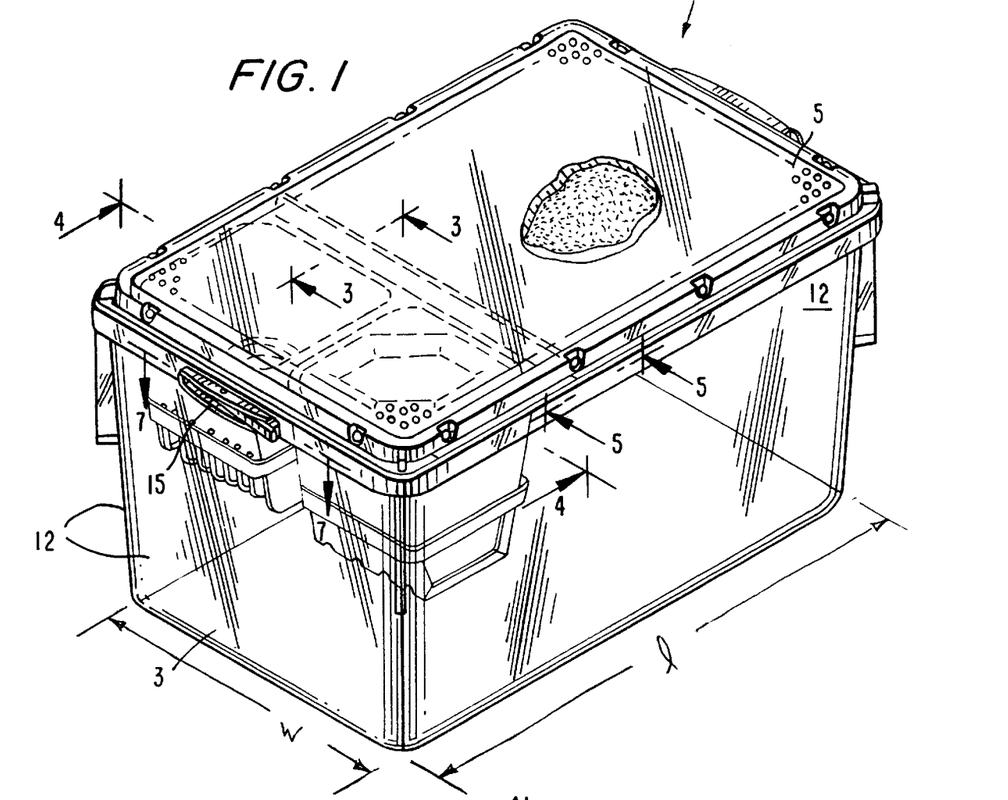
FIG. 1 is a perspective view of the cage constructed in accordance with the present invention.
Figure 2:
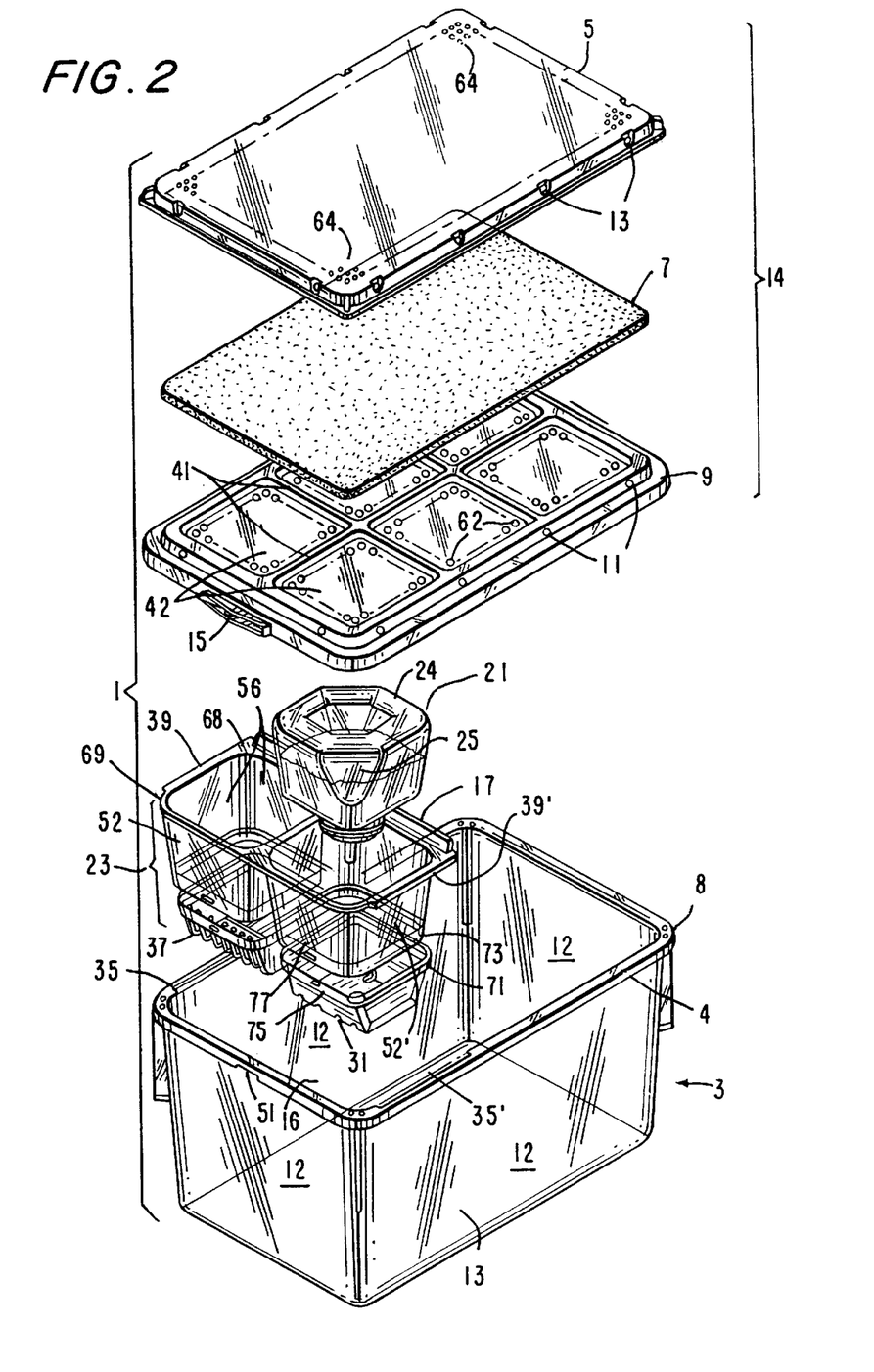
FIG. 2 is an exploded perspective view of the cage constructed in accordance with the invention.
Figure 3:
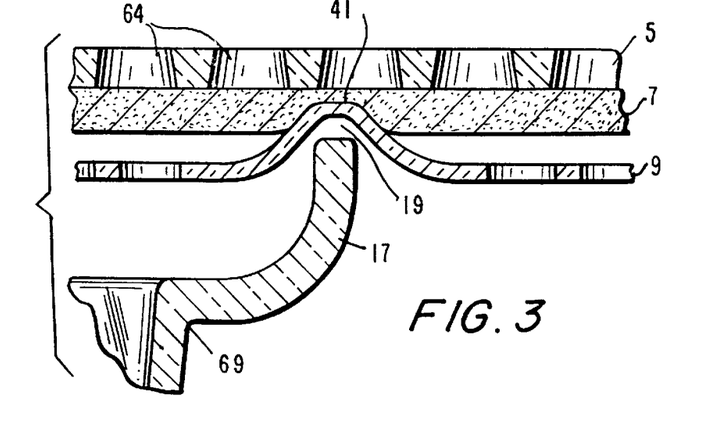
FIG. 3 is a cross sectional view taken along line 3—3 of FIG. 1.
Figure 4:
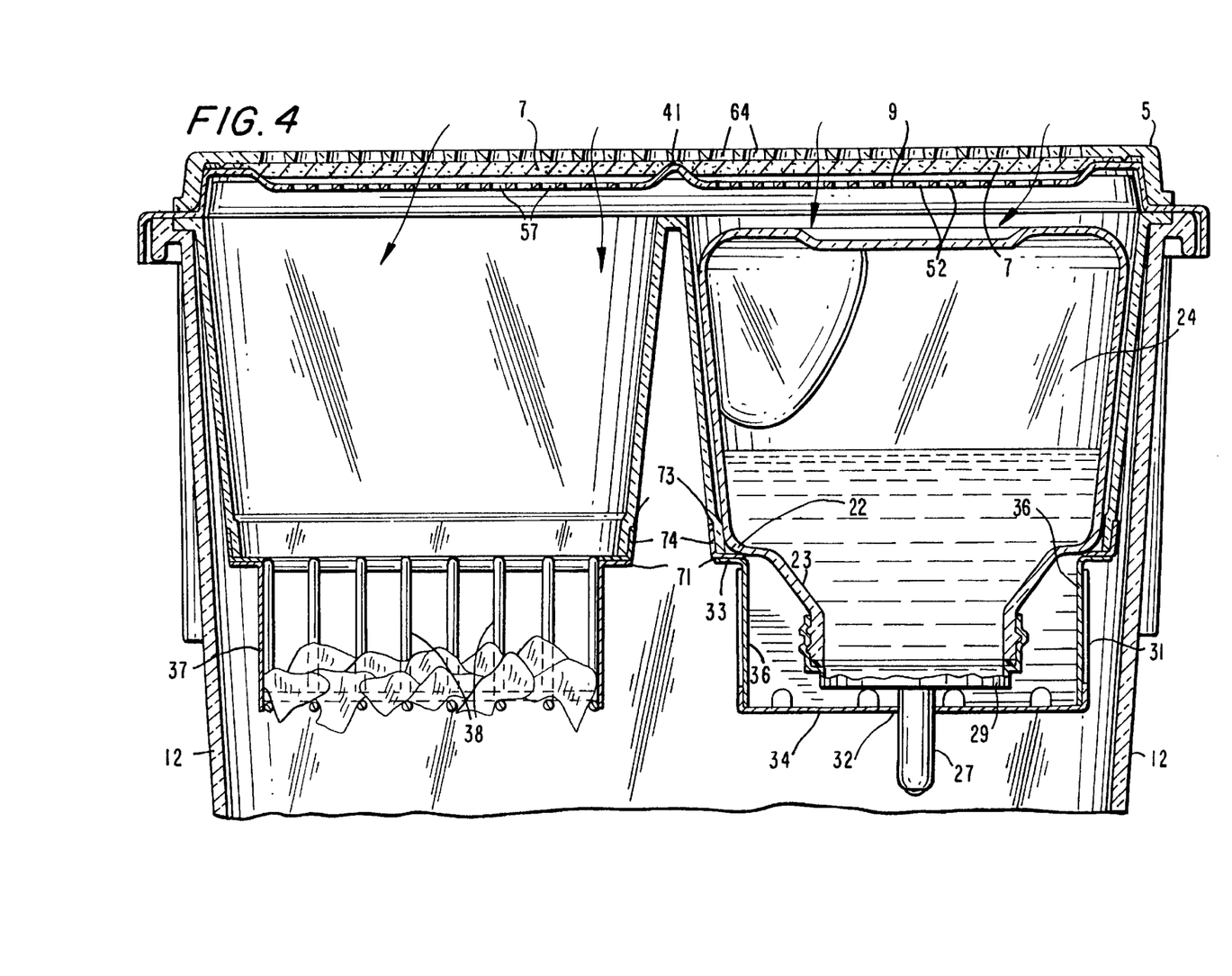
FIG. 4 is a cross sectional view taken along line 4—4 of FIG. 1.
Figure 5:
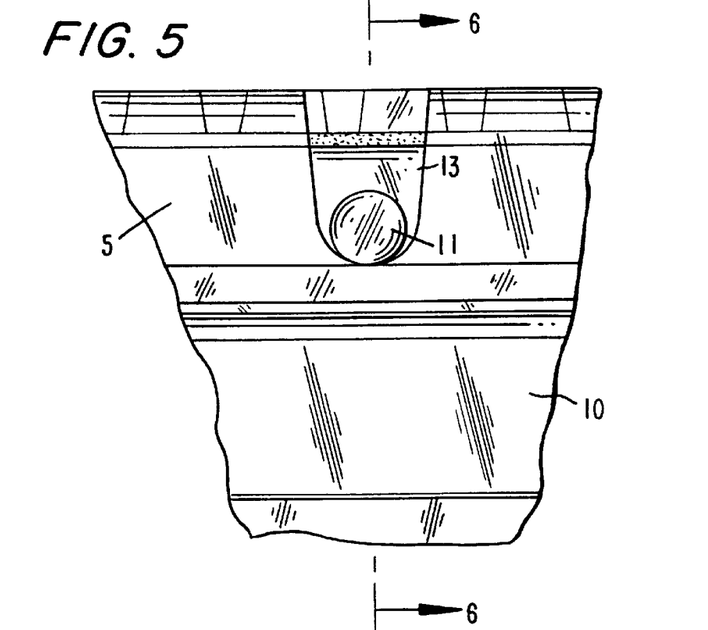
FIG. 5 is a cross sectional view taken along line 5—5 of FIG. 1.
Figure 6:
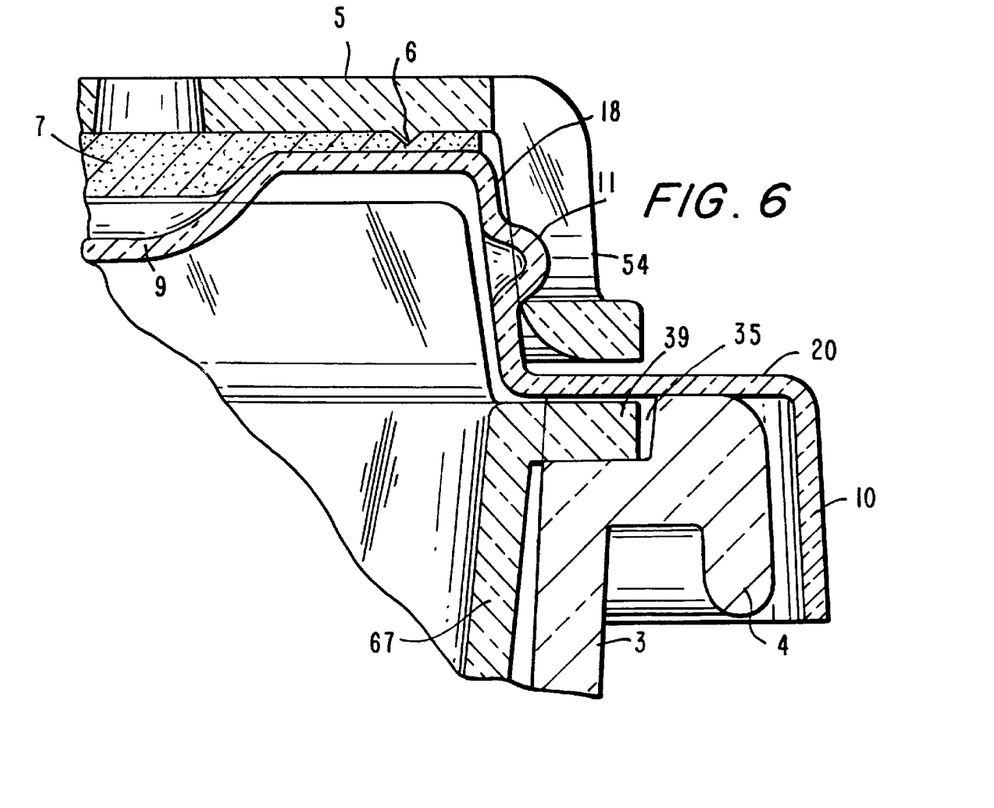
FIG. 6 is a cross sectional view taken along line 6—6 of FIG. 5.
Figure 7:
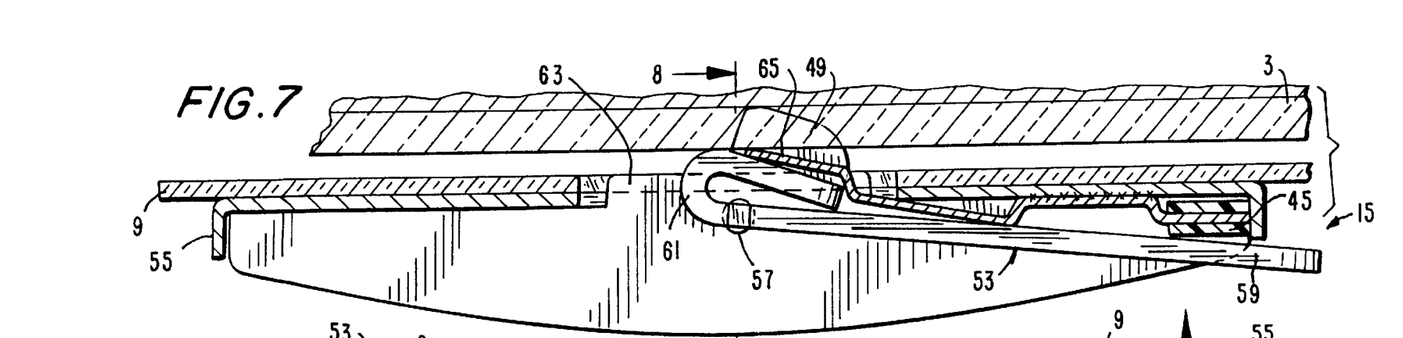
FIG. 7 is a cross sectional view taken along line 7—7 of FIG. 1.
Figure 8:
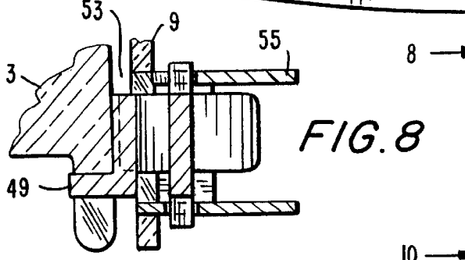
FIG. 8 is a cross sectional view taken along line 8—8 of FIG. 7.
Figure 9:
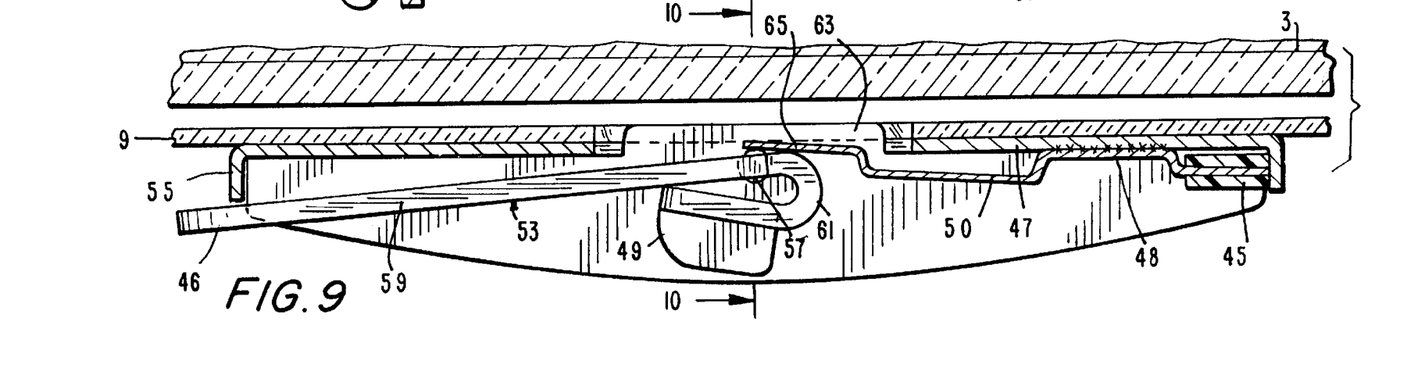
FIG. 9 is a cross sectional view of a lock constructed in accordance with invention in the unlocked position.
Figure 10:
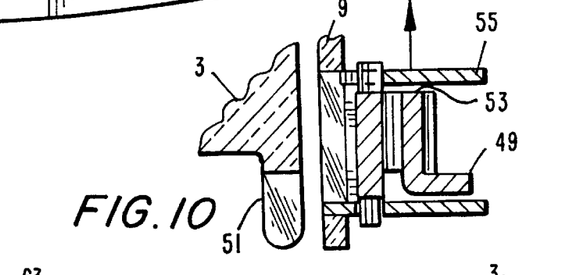
FIG. 10 is a cross sectional view taken along line 10—10 of FIG. 9.

Opposite cross beams 41 on the bottom surface of top 9 are a series of receiving portions 19. As seen in FIG. 3, receiving portions 19 are dimensioned and shaped so that when top 9 is placed on cage bottom 3 containing feeder assembly 23, lip 17 is introduced in receiving portion 19 that is adjacent lip 17 thereby creating a barrier to supports 52 and 52' of feeder assembly 23. In this way, rats in cage bottom 3 are prevented by lip 17 from gaining access to the food or water in support 52 from above. This also prevents access to lip 17 by the animal, preventing chewing of lip 17 itself. Also, because top 9 will not be properly seated on cage bottom 3 unless lip 17 is mated with receiving portion 19, this ensures that feeder assembly 23 is properly positioned in cage bottom 3 before cage 1 is closed by bonnet 14.

Along the periphery of top 9 is a descending rim 18. Disposed on rim 18 and protruding from top 9 are a plurality of detents 11. Extending from descending rim 18 along the periphery of top 9 is a horizontal flange 20. Vertically descending from flange 20 is a skirt 10. When top 9 is placed on cage bottom 3, flange 20 is seated flush on peripheral lip 8 of cage bottom 3 thereby minimizing the amount of air that flows out from the perimeter of top 9 thus maximizing the air flowing through filter 7. Also, because flanges 39, 39' of feeder assembly 23 are positioned within recesses 35, 35' and are flush with peripheral lip 8, top 9 forms a seal with cage bottom 3 along the entire periphery of cage bottom 3. Furthermore, skirt 10 which extends around rim 4 improves the seal formed between top 9 and cage bottom 3 by creating a circuitous path for air travel between the interior of cage 1 and the outside thereby inhibiting air from entering or leaving cage 1 at this junction point. In a exemplary embodiment, an additional sealing member, for example silicon or rubber material, may be applied to either or both border 20 or peripheral lip 8 thereby providing an O-ring type seal further limiting air passage via this route.

Filter 7 is placed on top of top 9 and is supported by cross beams 41 away from areas 42 to prevent contact with rats. Filter retainer 5 is placed on top of filter 7 and is dimensioned and shaped so as to cover the entire filter 7. Filter retainer 5 is also perforated, containing holes 64 throughout its surface thereby allowing air to pass through filter 7. Protruding from the bottom surface of filter retainer 5 and extending around the bottom surface of filter retainer 5 is a track 6. When filter retainer 5 is mounted on filter 7, track 6 compresses filter 7 against the top surface of top 9 thereby securing filter 7 in place and preventing air from leaking past the filter in any direction.

A descending border 54 extends from the outer periphery of filter retainer 5. A plurality of windows 13 are formed in border 54 of filter retainer 5. Windows 13 are dimensioned and positioned so that when filter retainer 5 is mounted on top of filter 7, windows 13 receive detents 11 of top 9, respectively, thereby securing filter retainer 5 to top 9. In this way, filter retainer 5, filter 7 arid top 9 of bonnet 14 form a unitary structure.

Top 9 may be made of plastic. To further prevent the animal from purchasing on top 9, air passages 62 are radiused to provide a smooth curved surface facing the animal. Passages 62 are also dimensioned to prevent the animal's nose, claws or teeth from reaching the filter.

Figure 11:
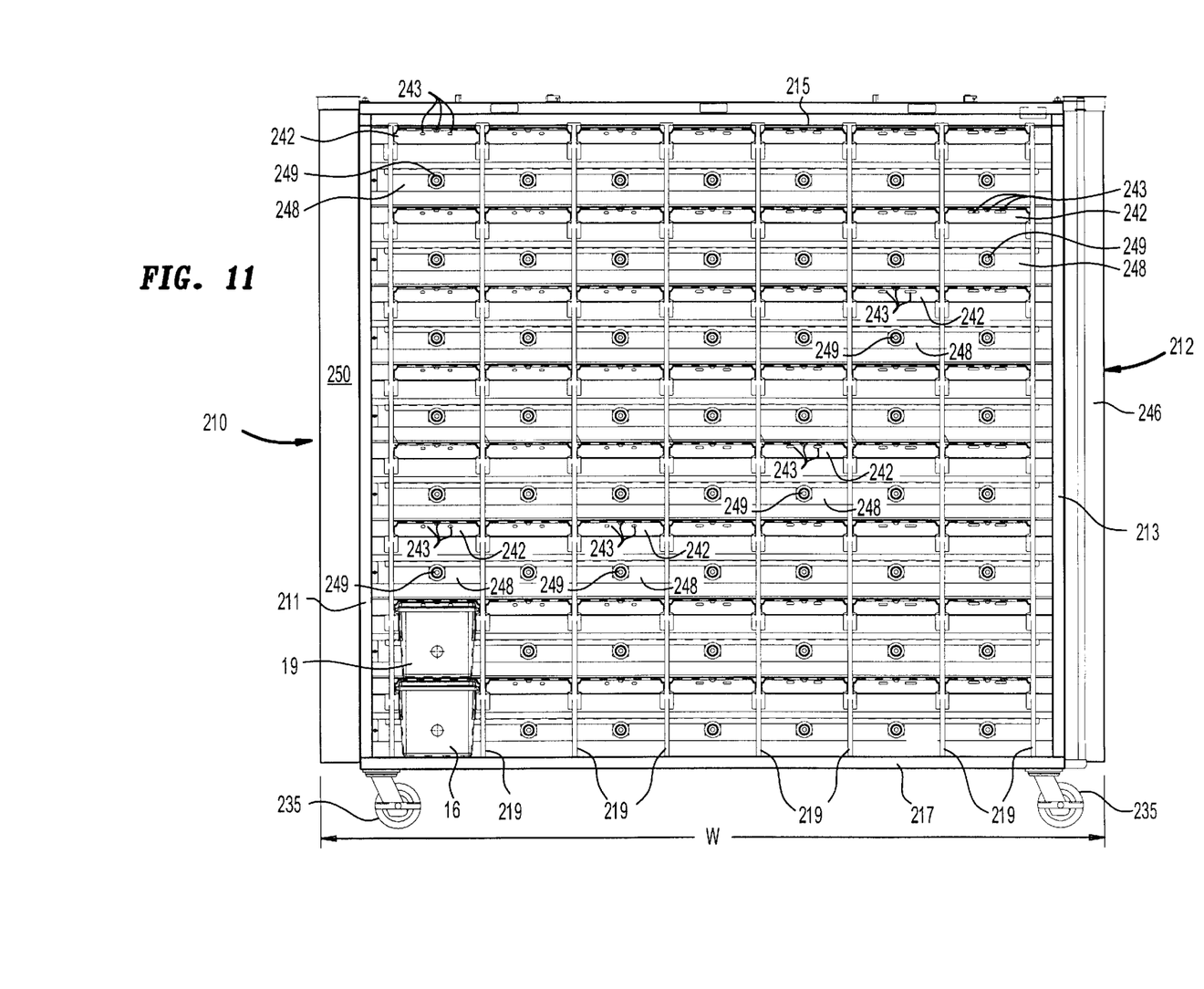
FIG. 11 is a front elevational view of the cage and rack system constructed in accordance with the invention.
Figure 12:
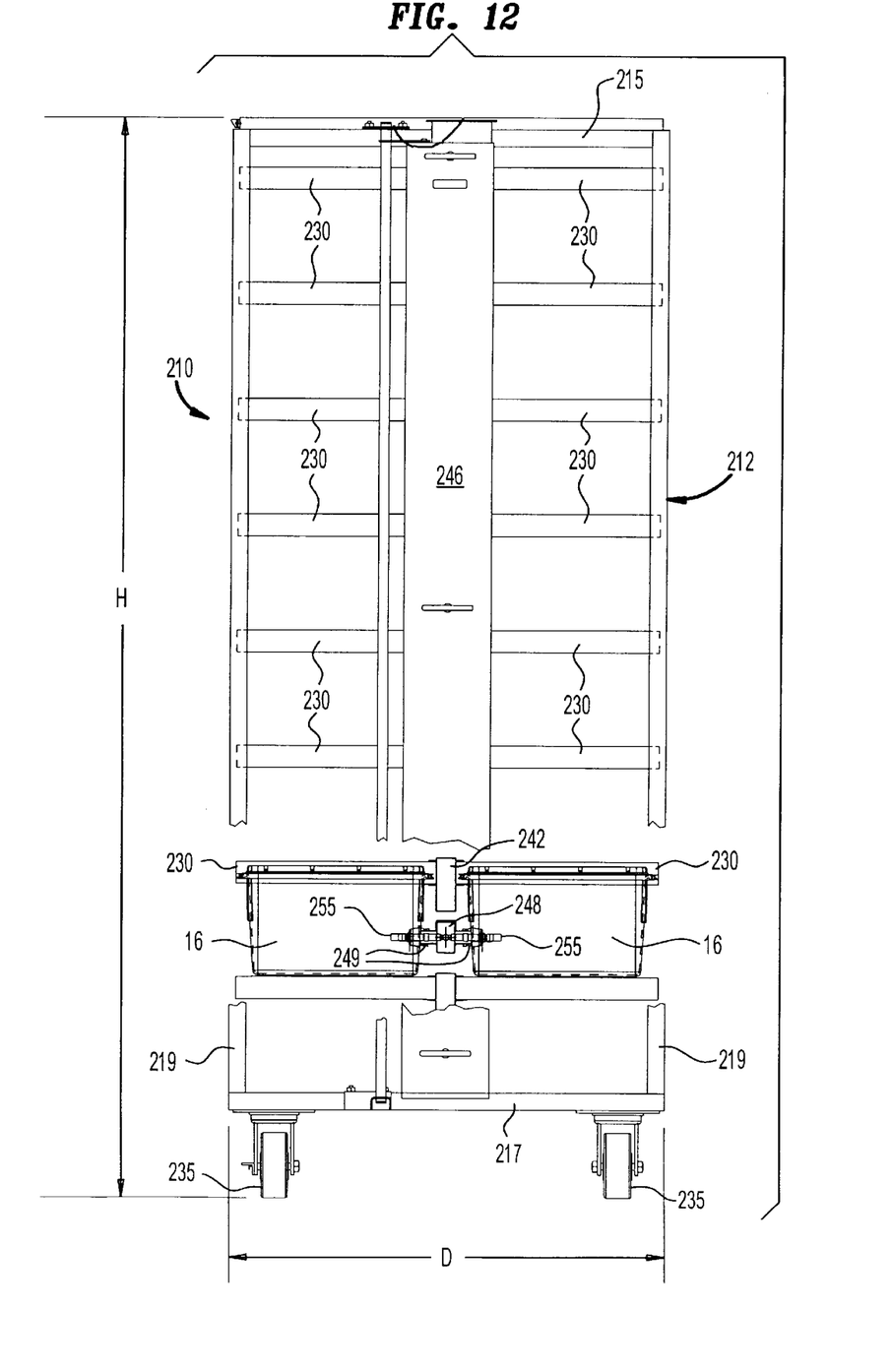
FIG. 12 is a side elevational view of the cage and rack system constructed in accordance with the invention; and, FIGS. 13(A) and 13(B) are an exploded perspective view of the cage constructed in accordance with a second embodiment of the invention.

Reference is now made to FIGS. 11 and 12, wherein a ventilated cage and rack system, generally indicated at 210 for supporting cages 1, constructed in accordance with the invention is shown. System 210 includes a rack 212. In a preferred embodiment rack 212 is a double sided rack each side being symmetrical with the other and only the front side being described for ease of analysis. Ventilated cage and rack system 210 includes an open rack 212 having a left side wall 211 and a right side wall 213, a top 215, and a bottom 217. A plurality of posts 219 are disposed in parallel between top 215 and bottom 217. Vertical posts 219 are preferably narrow and may comprise walls extending substantially from the front of rack 212 to the rear of rack 212, or may each comprise two vertical members, one at or near the front of rack 212 and the other at or near the rear of rack 212 (FIG. 12).

A plurality of rat cages 1 may be positioned within rack 212. Each cage is positioned within rack 212 by a canopy, generally indicated at 230. Each canopy 230 shrouds a cage 1 below a canopy 230. Accordingly, each canopy 230 is shaped and positioned so as to substantially surround the top 9 of the cage 1b while maintaining a short gap h between top 9 and canopy 240. Perforations 243 are positioned adjacent each of canopies 240. Gap h should be sufficient to allow movement of gases between canopy 230 and top 9, and top 9, and in an exemplary embodiment gap h is 3/16 of an inch to 1/4 of an inch. Canopy 230 profiles bonnet 14, preferably creating a tension fit against the side wall of bottom 3 of cage 1b. The rear of canopy 230 contacts air exhaust plenum 242.

Canopies 230 are disposed in parallel columns in rack 212 between each pair of adjacent posts 219, or between left side wall 211 and an adjacent post 219, or between right side wall 213 and an adjacent post 219. Each canopy 230 supports a first cage 19 above the canopy 230 in the rack 212 and shrouds the filter cap 224 of a second cage 1b below the canopy 230 in the rack 212. The bottom portion 3 of the first cage 1a rests on top of the corresponding canopy 230. Of course, those canopies positioned at the top row of rack 212 do not support a cage 1 above them, and those cages 1 positioned on the bottom row of rack 12 are preferably supported by bottom 217 of rack 212. When positioned in the rack, each cage 1 communicates with air supply plenum 240 through cage coupling. Such cage couplers 249 are known in the art, and are disclosed, for example in U.S. Pat. Nos. 4,989,545 and 5,042,429 assigned to Lab Products, Inc. Air supply plena 240 may also include water valves 255 for delivering a supply of water to cages 1 through cage coupling 249, as is also known in the art. Canopies 230 are preferably constructed of a lightweight, transparent material which is substantially rigid, such as clear plastic. Such clear plastic canopies provide enhanced visibility of cages 1 within rack system 210 and reduce the overall weight of rack system 10.

Each canopy 230 is preferably mounted to air plenum 242 at the rear and to two posts 219 at the front of rack 212. Perforations 243 are disposed within an area outlined by canopy 230 to remove air within gap h. Each post 219 preferably comprises a vertical T-beam, with a first face being disposed substantially parallel to the direction of insertion of a cage 1 into rack 12 and a second face being disposed substantially perpendicular to the direction of insertion. To maximize horizontal cage density within rack 212, the first face of post 219 is preferably made as narrow as possible while still providing structural support for rack 212. By providing such a notched T-beam post 219 on each side of canopy 230, canopy 230 may be supported on both sides from the front of rack 212. Other means of providing the support of posts 219 are contemplated by the invention. For example, a notched L-beam post 219 could be used, thereby providing support to only one side of canopy 230 from the rack, or canopies 230 could be screwed to a flat vertical panel disposed parallel the cage insertion direction and extending from the top to the bottom of rack 212. Rack 212 is provided with wheels 235 for mobility.

In a preferred embodiment, the rack 212 has a width W of 86.25 inches, a depth D of 32.5 inches and a height H of 79.875 inches. A limitation on the rack is that it should fit through a standard door. To achieve this result, height of the rack can be no greater than 80 inches and the depth of the rack with cages stacked on either side, if a dual sided rack, can be no greater than 36 inches. In a preferred embodiment, rack 212 supports one hundred and twelve cages 1. Because the cages have a floor space of between 80 inches and 140 inches, they hold a minimum of two rats per cage for a total of two hundred twenty four rats between 300 and 400 grams each. At the same, at least five mice of up to 25 grams can be housed per cage yielding five hundred sixty mice for the entire rack. This is in comparison with prior art rat units which had a width of 85.063 inches, a depth of 26.375 inches and a height of 65.062 inches and which housed only thirty-six 140 square inch cages. Placing three rats into each of the prior art cages yielded one hundred and eight rats. Accordingly, the number of rats housed in the present rack is an increase of 107% over the number of rats housed in prior units without a corresponding increase in rack footprint. At the same time, the reduction in the number of mice housed in a rat cage of the type disclosed herein as compared to the rack specifically designed for mice is a reduction of less than 20%. Accordingly, the efficiency of the overall rack system for housing both mice and rats is increased.

Reference is now made to FIGS. 7–10. A lock 15 is mounted on skirt 10 of top 9. Lock 15 includes a channel-shaped lock housing 55 that is fixed to skirt 10. Lock spring 47, disposed in housing 55, includes a visual alert 45 portion upon which is mounted a visual alert 46, a securing portion 48, a tension portion 50 and a biasing portion 65. Lock spring 47 is positioned in housing 55 so that biasing portion 65 is adjacent the center of housing 55. Lock spring 47 is secured to housing 55 by connecting securing portion 48 to the back wall of housing 55 using any suitable technique, such as welding or gluing. In an exemplary embodiment, lock spring is constructed from a hard, resilient material, such as a strip of metal, and is shaped so that visual alert portion 45 and tension portion 50 are spaced away from the back wall of housing 55. Mounted in the center of housing 55 is a pivot 57. Lock spring 47 is of a sufficient length so that biasing portion 65 extends to a point intermediate pivot 57 and the back wall of housing 55.

A lock bar 53 is disposed in housing 55 and includes an arm 59 and a curved portion 61 at an end of arm 59. Lock bar 53 is rotatably mounted on pivot 57 at an end of arm 59 that is adjacent curved portion 61. Lock bar 53 is of a sufficient length so that a portion of arm 59 extends outside housing 55 when lock 43 is in either the locked or unlocked position so that lock bar 53 may be easily gripped and rotated. A lock flange 49 extends horizontally from a lower edge of curved portion 61 of lock bar 53.

When lock bar 53 is rotated away from lock spring 47, lock flange 49 faces away from cage bottom 3 and lock 15 is in the unlocked portion. In this position, biasing portion 65 is biased against the portion of lock bar 53 that is adjacent pivot 57 thereby keeping lock bar 53 from rotating towards lock spring 47 and keeping lock 43 in the unlocked position. In the unlocked position, visual alert 45, preferably a readily visible member such as a yellow tab, is exposed indicating that lock 15 is unlocked.

When lock bar 53 is rotated to lock spring 47, lock flange 49 is inserted into a notch 51 disposed in cage bottom 3 thereby securing top 9 to cage bottom 3. While in the locked position, biasing portion 65 is biased against curved portion 61 of lock bar 53 at a point that is vertically adjacent to lock flange 49 thereby keeping lock bar 53 from rotating away from lock spring 47 and keeping lock 15 in the locked position. Also, because lock bar 53 covers visual alert 45 when lock bar 53 is rotated towards lock spring 47 into the locked position, the locked cages 1 are readily distinguishable from the unlocked cages 1.

Rat cage 1 constructed in accordance with the present invention offers many advantages over prior art cages. First, because the dimension of cage bottom 3 is optimally selected to have an area substantially between 80 and 140 square inches, cage 1 can be used for mice, rats, hamsters and guinea pigs while confirming to ILAR guidelines. By providing a universal cage size, the need for storing and managing different size cages and different size racks to support the different cage sizes is eliminated. Also, because feeder assembly 23 is modular and adaptable by snapping on either water bottle support 31 or food holder 37, as needed to support the varying eating requirements of the different studies and rats, storage and maintenance of feeder assembly 23 is greatly simplified.

The durability and reliability of cage 1 of the present invention is also improved. Also, rounded lip 17, extending from feeder assembly 23, which is received by receiving portion 19 of top 9, prevents rats from perching and accessing food in feeder assembly 23 from above. By radiusing supports 52, 52' of feeder 23, eliminates purchase points on the feeder. Furthermore, by mounting either water bottle support 31 or food holder 37, both made of stainless steel, to the bottom of supports 52, 52' of feeder assembly 23, the rats are prevented from gnawing through the bottom of feeder assembly 23. Also, by forming top 9 from stainless steel, or radiusing passages 62 in plastic the rats will be unable to gnaw through bonnet 14. Finally, by including lock 43 on bonnet 14, the rats housed in cage bottom 3 will be unable to displace bonnet 14 and escape.

Furthermore, the ventilation of the cage is greatly improved by eliminating the wire lid that was used in prior art cages and reducing the Venturi effect therein. Also, because flanges 39, 39' are mounted flush in feeder recesses 35, 35', respectively, bonnet 14 forms an improved seal with cage bottom 3 preventing air from passing through this junction and forcing more air through filter 7. In addition, by providing a sealing member such as rubber or silicon along the junction between top 9 and cage bottom 3, the seal is further improved and ventilation through filter 7 is increased.

Cage 1 constructed in accordance with the present invention is also easier to use than the prior art cages. First, because cage bottom 3 is constructed from transparent material, visibility of the rats in cage bottom 3 is improved. Also, by inserting feeder assembly 23 at the rear of cage bottom 3, visibility and access to the animals is improved. Furthermore, because sections 52, 52' of feeder assembly 23 is constructed from clear plastic, inspection of the food and water levels in feeder assembly 23 is facilitated without having to remove bonnet 14. By supporting the water bottle in a substantially vertical position, not only does substantially all of the liquid flow from the bottle, but the bottle utilizes less cage volume than if oriented at an angle. Also, by using water bottle 21 having molded recesses 25, the insertion and removal of water bottle 21 from section 52 is simplified and eliminating the step of separately removing the lid and setting it aside. In addition, because bonnet 14 is formed as a unitary structure, top 9, filter 7 and filter retainer 5 may be removed from cage bottom 3 in one piece thereby easing access to the interior of cage bottom 3. In addition, because filter retainer 5 may be removed from top 9 while top 9 is still secured to cage bottom 3, filter 7 may be inspected and changed while keeping the rats securely locked in cage bottom 3. Finally, visual alert 45 of lock 43 simplifies the determination of which cages 1 are in the unlocked position.

Reference is now made to FIGS. 13–16 in which a second embodiment of the cage is shown, like numbers being used for like structures, the primary difference between this embodiment and the previous embodiment being in the filter bonnet is constructed as a four part structure having a top, a retainer disposed on top of the top, a filter sandwiched there between, and a shield attached to the top at an interior surface thereof.

Specifically bonnet 200 includes a retainer 210, a top 220, a filter 240 disposed there between, and a shield 250 affixed to the interior of top 220. Top 220 is again preferably formed of clear plastic which is substantially rigid, but permits a modest degree of flexure when tortional forces are applied thereto. Top 220 has a perforated top wall 222 with perforations 224 forming a grid array. Respective opposed pairs of side walls 226 depend substantially orthoganly from top wall 222. The surface formed on top 220 for resting bonnet 200 on cage bottom 3 includes a continuous lateral peripheral flange 238 extending generally perpendicularly outwardly from side walls 226. A continuous flange 230 depends from lateral peripheral flange 238 to encompass the open top 16 of cage bottom 3. Ribs 237 (FIG. 13) extend from flange 230 to allow stacking of bonnet 200. Furthermore, ribs 232, 234 extend from top wall 222 and in a preferred embodiment frame the grid array formed by perforations 224. A hole 236 is provided through top wall 222 and is dimensioned to receive a rivet 300.

Figure 16:
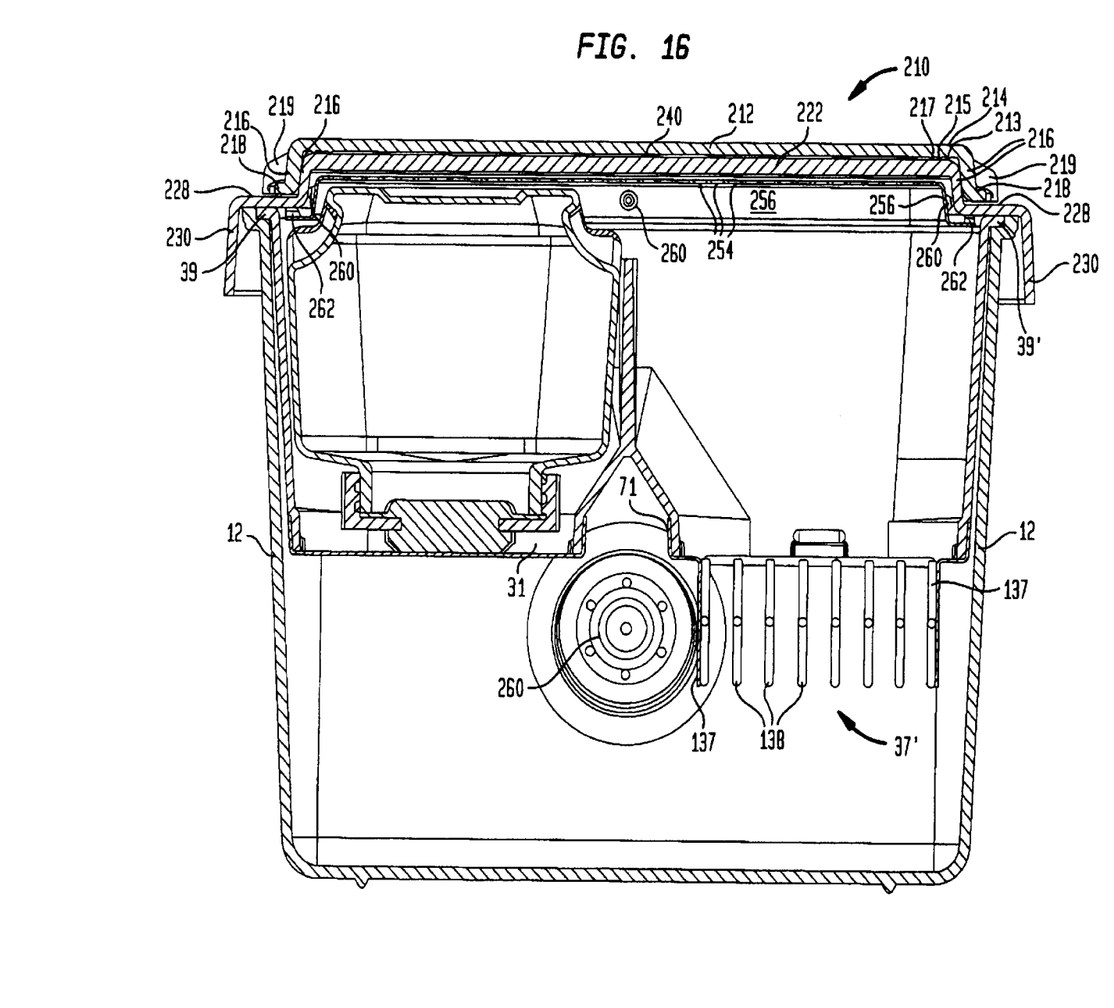
FIG. 16 is a sectional view taken along line 16—16 of FIG. 14.

As shown in FIGS. 15 and 16, flange 230 is spaced from, encompasses and overhangs, lip 8 of cage bottom 3. Thus, top 220 cannot be inadvertently dislodged from cage bottom 3 and must be lifted off to be removed. It should also be noted that the clearance space between flange 230 and lip 8 should permit only a slight movement of bonnet 200 on cage bottom 3. However, peripheral flange 238 preferably has a sufficient lateral extent to remain in contact with lip 8 despite any relative lateral movement between bonnet 200 and cage bottom 3, thereby maintaining the integrity of the "petrie dish" configuration between bonnet 200 and cage bottom 3.

Filter retainer 210 is preferably formed of material having the same properties as those of top 220 described above, but with a different rigidity. Filter retainer 210 detachably and securably maintains an air filter 240 to the top surface of top wall 222. Filter retainer 210 includes a generally flat perforated top wall 212. Top wall 212 includes a substantially rectangular border portion 214. An outer edge of border portion 214 is joined to integrally molded side walls 216 which depend therefrom and extend continuously from top wall 212, and which closely fit side walls 226 of top 220 as shown in FIGS. 15 and 16. A lateral peripheral flange 218 extends from side wall 216. Ribs 219 extend from respective corners of filter retainer 210 and provide structural integrity. Additionally, ribs 219 act as stacking guides for positioning successive retainers or even successive bonnets.

Three spaced apart ribs 213, 215, 217 extend from a bottom surface of top wall 212 below border 214 and receive therein ribs 232, 234 of top wall 222 of top 220.

A shield 250 has a top wall 252 with perforations 254 therein. A side wall 256 descends from top wall 250 to a substantially right angle. A flange 258 extends at an angle from side wall 256. Spacers 260 are formed on side wall 256 and dimples 262 are formed in flange 258. A hole 264 is formed through top wall 252 and corresponds with a position on top wall 252 to align itself with hole 236 through top wall 222 when shield 250 is placed within top 220.

Rivet 300 extends through holes 236, 264 to affix shield 250 to the underside of top wall 222 of top 220. Spacers 256 and dimples 260 come in contact with side walls 226 and flange 238 respectively to act in concert with rivet 300 to hold shield 250 within top 220 at a fixed distance which allows little or no play between the two. Flange 258 extends a distance to effectively prevent access to the position where flange 238 rests on lip 8 of cage bottom 3. In a preferred embodiment, shield 250 is made out of stainless steel, but may also be made of the same plastic material as top 220 or filter retainer 210.

In a preferred embodiment, filter 240 is a thin sheet of spun-bonded polyester of the type sold by DuPont under the trademark REEMAY 2024. A filter thickness of between 11 and 13 mils has been found adequate for a filter having an area approximately equivalent to top wall 222 of top 220. Air filter 240 mounted on the top surface of filter top 220 and is held in place by filter retainer 210 in a manner to now be described. REEMAY 2024 is used by way of example only and any filter medium having at least its properties or similar properties may be utilized.

To assemble bonnet 200, air filter 240 is placed against the bottom surface of top wall 212 of filter retainer 210. Thereafter, top 220 is placed within filter retainer 210 and ribs 213, 215, 217 interlock with ribs 232, 234 serving to hold filter 240 securely in place against the top surface of top wall 222. Top wall 212 of filter retainer 210 is provided with perforations 209 which are preferably substantially co-extensive and in alignment with perforations 224 in top wall 222 of top 220 when filter retainer 210 is mounted atop top 220. The mesh grid of top wall 222 of top 220 serves to prevent air filter 240 from sagging and holds air filter 240, while filter retainer 210 holds filter 240 securely in place against the top surface of top wall 222.

In assembled bonnet 200, perforated top wall 212 overlies filter 240 to protect the filter against damage during handling and prevents its movement or buckling. Filter 240 rests flush upon perforated top wall 222 of top 220 which supports and protects air filter 240 in its mounted position. Shield 250 permanently affixed to top wall 222 prevents purchasing on top wall 222 by the animals and further protecting the filter from below. Additionally, touching the filter with fingers may destroy the filter integrity, and therefore the perforated walls on either side of the filter prevent contact with the filter by the technician during handling and also prevents contact with the filter by the animals removing the necessity for wire bar lids and increasing the usable volume of the cage.

Filter retainer 210 is held in place by means of small projections or detents 227 which are integrally molded on the outer surface of side walls 226 of top 220. Similarly, apertures or slots 211 are formed in side walls 216 of filter retainer 210 which are positioned and dimensioned so as to snugly receive detents 227 when filter retainer 210 is mounted on top 220. In an alternative embodiment, detents may be formed on the inner surface of side wall 216 of filter retainer 210, while slots 211 may be formed on side walls 226 of filter top 220. It is also possible to dimension filter retainer 210 to be held to top 220 by tension fit.

By providing a bonnet which sandwiches the filter between the cage top and a filter retainer, the filter is protected from inadvertent contact. Furthermore, by providing a shield beneath the cage top, the cage top and filter are protected from the animals contained therein. Furthermore, by affixing the shield to the top and spacing the shield from the top, an autoclavable top structure is provided which provides protection to the top and does not require disassembly and reassembly during use or prior to autoclaving. The space formed between the shield and the cage top allows improved washing of the entire assembly because the space reduces the accumulation of debris and allows water penetration during the cleaning process. The dimples also allow the shield to protrude to an area adjacent the cage/filter top meeting juncture when the filter top is positioned on the cage. This allows the shield to protect the cage lip, the cage/top juncture areas, and the food/water delivery recess area that does not contain the feeder assembly. By making the shield fastener a stainless steel semi-tubular rivet, it provides a secure condition without applying excessive pressure which would cause cracking due to dissimilar material shrinkages during the autoclaving process.

It will thus be seen that the objects set forth above, and those made apparent from the preceding description, are efficiently obtained and, because certain changes may be made in the above constructions without departing from the spirit and scope of the invention, it is intended that all matter contained in the above description are shown in the accompanying drawings shall be interpreted as illustrative and not in an limiting sense.

It is also to be understood that the following claims are intended to cover all the generic and specific features of the invention herein described, and all statements of the scope of the invention which, as a matter of language, might be said to fall there between.

What is claimed is:

1. A filter bonnet for an open-top cage comprising:
   a filter top adapted to cover the open top of the open-top cage, the filter top having a body portion with a perforated filter top top wall and filter top side walls extending therefrom forming an open bottom end, and a shield, wherein said shield is permanently affixed to the filter top top wall and disposed within an area defined by said filter top side walls said shield further comprises a shield side wall, a shield flange, a plurality of spacers extending from said shield side wall, and a plurality of dimples extending from said shield flange to maintain said shield at a predetermined distance from said filter top.

2. The filter bonnet of claim 1, wherein said shield includes a shield top wall, a shield side wall extending from said shield top wall at a substantially right angle and a flange extending from said shield side wall at a substantially right angle thereto, said shield being affixed to said filter top top wall.

3. The bonnet of claim 2, wherein said filter top wall is formed with a first hole therein, said shield top wall of said shield is formed with a second hole therein and further comprising a rivet received by said first and second holes for affixing said shield to said filter top wall.

4. The filter bonnet of claim 1, wherein said shield is disposed within said filter top at a predetermined distance spaced from said filter top.

5. The filter bonnet of claim 1, wherein said filter top and said shield are perforated.

6. The filter bonnet of claim 1, further comprising a substantially rigid filter retainer sized to fit upon the filter top and to substantially cover the filter top; the filter retainer having a perforated retainer top wall and the filter retainer also having retainer side walls extending from the retainer top forming an open bottom end and being detachable secured to the filter top.

7. The filter bonnet of claim 6, wherein said filter top top wall is perforated and said retainer top wall includes perforations substantially co-extensive with the perforations in the filter top top wall, the perforations in the filter retainer being substantially in alignment with the perforations in the filter top when the filter retainer is mounted on the filter top; and securement members detachably securing the filter retainer to the filter top to permit enclosure of a sheet of filter material there between; the securement member being integrally formed in the filter top and the retainer.

8. The filter bonnet of claims 7, wherein the securement member comprises at least one detent formed in at least one filter top side wall, and at least one slot formed in at least one retainer side wall disposed so as to receive the detent therein when the filter retainer is mounted on the filter top.

9. The filter bonnet of claim 7, wherein the filter top and the filter retainer have sufficient flexure for the filter retainer and the filter top to flex relative to each other.

* * * * *